US012687259B2

(12) United States Patent
Ikeda et al.

(10) Patent No.: US 12,687,259 B2
(45) Date of Patent: Jul. 21, 2026

(54) LIQUEFIED GAS MONITORING SYSTEM

(71) Applicant: KAWASAKI JUKOGYO KABUSHIKI KAISHA, Kobe (JP)

(72) Inventors: Takeshi Ikeda, Kobe (JP); Masanori Hamamatsu, Kobe (JP); Suguru Oyama, Kobe (JP); Takayuki Yagi, Kobe (JP); Hiroyasu Okawa, Kobe (JP); Masayuki Mitsue, Kobe (JP); Kiyono Kamiya, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 298 days.

(21) Appl. No.: 18/695,543

(22) PCT Filed: Sep. 26, 2022

(86) PCT No.: PCT/JP2022/035601
§ 371 (c)(1),
(2) Date: Mar. 26, 2024

(87) PCT Pub. No.: WO2023/054232
PCT Pub. Date: Apr. 6, 2023

(65) Prior Publication Data

US 2025/0116377 A1 Apr. 10, 2025

(30) Foreign Application Priority Data

Sep. 28, 2021 (JP) ................................ 2021-157355

(51) Int. Cl.
*F17C 13/02* (2006.01)
*F17C 5/02* (2006.01)

(52) U.S. Cl.
CPC .............. *F17C 13/021* (2013.01); *F17C 5/02* (2013.01); *F17C 13/025* (2013.01);
(Continued)

(58) Field of Classification Search
CPC ........ F17C 13/021; F17C 5/02; F17C 13/025; F17C 13/026; F17C 2223/0153;
(Continued)

(56) References Cited

U.S. PATENT DOCUMENTS 6,662,649 B1 * 12/2003 Knight .................. G01F 23/802 250/357.1
2013/0263610 A1 10/2013 Mackey
(Continued)

FOREIGN PATENT DOCUMENTS

JP 2003-130296 A 5/2003
JP 2020-86503 A 6/2020

*Primary Examiner* — Tarun Sinha
(74) *Attorney, Agent, or Firm* — Oliff PLC

(57) ABSTRACT

A liquefied gas monitoring system includes: a container containing liquefied gas, which is obtained by liquefaction of single-component gas; a liquid level sensor, which detects liquid level height in the container; and control circuitry, which receives, each time the liquefied gas is fed into the container, an input of an environmental value of the gas. Before the liquefied gas is fed into the container, the control circuitry determines an amount of the liquefied gas previously fed into and still remaining in the container based on the height detected by the liquid level sensor, and stores the determined amount together with the environmental value. After the liquefied gas is fed into the container, the control circuitry determines an amount of the liquefied gas fed at this time based on the height detected by the liquid level sensor, and stores the determined amount of the liquefied gas together with the environmental value.

7 Claims, 3 Drawing Sheets

(52) U.S. Cl.
CPC .... *F17C 13/026* (2013.01); *F17C 2223/0153* (2013.01); *F17C 2223/04* (2013.01); *F17C 2225/04* (2013.01); *F17C 2250/03* (2013.01); *F17C 2250/0408* (2013.01); *F17C 2250/043* (2013.01); *F17C 2250/0439* (2013.01)

(58) Field of Classification Search
CPC .............. F17C 2223/04; F17C 2225/04; F17C 2250/03; F17C 2250/0408; F17C 2250/043; F17C 2250/0439; F17C 2221/012; F17C 2221/033; F17C 2223/0161; F17C 2223/033; F17C 2225/0161; F17C 2225/033; F17C 2250/032; F17C 2250/0421; F17C 2250/0495; F17C 2260/024; F17C 2270/0105; F17C 13/023; F17C 3/02; G06Q 30/018; G06Q 50/06; G06Q 50/10; G01D 21/02; G01L 9/12; G01F 1/007; G01F 3/38; G01F 1/34; G01F 23/284; G01F 23/2962; G01F 13/006; G01F 23/80; G01F 23/296
See application file for complete search history.

(56) References Cited

U.S. PATENT DOCUMENTS

2018/0340813 A1 11/2018 Cowles et al.
2020/0156925 A1 * 5/2020 Hasegawa ................ B67D 7/24

* cited by examiner

LIQUEFIED GAS MONITORING SYSTEM

CROSS-REFERENCE TO RELATED APPLICATIONS

This is a U.S. National Phase of International Application No. PCT/JP2022/035601 filed Sep. 26, 2022, which claims the benefit of Japanese Application No. 2021-157355 filed Sep. 28, 2021. The disclosure of the prior applications is hereby incorporated by reference herein in its entirety.

TECHNICAL FIELD

The present disclosure relates to a liquefied gas monitoring system.

BACKGROUND ART

Conventionally, liquefied gases obtained by liquefaction of single-component gases have been traded. Examples of such single-component gas include hydrogen, ammonia, and methane. In a general gas liquefaction method, the gas is cooled and condensed. Alternatively, there is a method that uses, as liquefied gas, an organic hydride (e.g., methylcyclohexane) in which reversibly releasable hydrogen is chemically combined with benzene or naphthalene, because the organic hydride is in a liquid form at normal temperature and pressure. That is, in the case of using the organic hydride, hydrogen is liquefied by chemically combining the hydrogen with a carrier.

CITATION LIST

Patent Literature

PTL 1: Japanese Laid-Open Patent Application Publication No. 2020-86503

SUMMARY OF INVENTION

Technical Problem

There is a case where in the process of commodity circulation of liquefied gas, the liquefied gas gets mixed with the same kind of liquefied gas in a container. In this case, however, even though one liquefied gas and the other liquefied gas that are mixed together are the same kind of liquefied gas, the environmental value of each liquefied gas varies depending on, for example, its production method. Accordingly, when the one liquefied gas and the other liquefied gas with different environmental values from each other are mixed together in the container, the environmental value of the mixed liquefied gas in the container will be different from these environmental values. In electric power trading, not only is the electric power itself traded, but the environmental value thereof is also traded. It is considered that this will be the case also in the future liquefied gas trading. For this reason, in a case where one liquefied gas and the other liquefied gas with different environmental values from each other are mixed together in the process of their commodity circulation, it is necessary to calculate the environmental value of the mixed liquefied gas to ensure the reliability of the trading.

The “environmental value of the liquefied gas” herein means an economic value thereof that indicates the level of contribution to environmental load reduction in the production of the single-component gas. For example, the environmental value is high in a case where the amount of carbon dioxide emission in the production of the single-component gas is small. In a case where single-component gas is produced by chemical bonding of different components to each other (e.g., in a case where ammonia is produced by chemical bonding of hydrogen and nitrogen to each other), the amount of carbon dioxide emission in the production of each of these different components is also reflected in the environmental value of the single-component gas.

In order to properly calculate the environmental value of the aforementioned mixed liquefied gas, it is necessary to precisely recognize the amounts of the one liquefied gas and the other liquefied gas that are mixed together and their respective environmental values. Patent Literature 1 describes a hydrogen gas supply system for supplying hydrogen gas to a user as a fuel. Patent Literature 1 describes that one hydrogen gas and the other hydrogen gas with different environmental values from each other are mixed together in a hydrogen gas container, and the environmental value of each hydrogen gas and the environmental value of the mixed hydrogen gas are separately displayed on a display. However, a problem to be solved by the technique of Patent Literature 1 has nothing to do with the above-described mixing of liquefied gas.

In view of the above, an object of the present disclosure is to provide a liquefied gas monitoring system that makes it possible to precisely recognize the amounts of one liquefied gas and the other liquefied gas that are mixed together and their respective environmental values.

Solution to Problem

The present disclosure provides a liquefied gas monitoring system including: a container that contains liquefied gas that is obtained by liquefaction of single-component gas; a liquid level sensor that detects a liquid level height in the container; and control circuitry that receives, each time the liquefied gas is fed into the container, an input of an environmental value of the fed liquefied gas. The control circuitry: before the liquefied gas is fed into the container, determines an amount of the liquefied gas previously fed into and still remaining in the container based on the liquid level height detected by the liquid level sensor, and stores the determined amount of the previously fed liquefied gas together with the environmental value; and after the liquefied gas is fed into the container, determines an amount of the liquefied gas fed at this time based on the liquid level height detected by the liquid level sensor, and stores the determined amount of the liquefied gas fed at this time together with the environmental value.

Advantageous Effects of Invention

The present disclosure makes it possible to precisely recognize the amounts of one liquefied gas and the other liquefied gas that are mixed together and their respective environmental values.

DESCRIPTION OF EMBODIMENTS

FIG. 1A to FIG. 3B show a liquefied gas monitoring system 1 according to one embodiment. In the present embodiment, the liquefied gas monitoring system 1 is installed on a ship 5. Alternatively, the liquefied gas monitoring system 1 may be installed on a stationary facility, such as a marine facility or an on-land facility, or may be installed on a mobile body that travels on the land or in the air (e.g., a tank truck, a railcar, or an airplane).

Figure 1A:
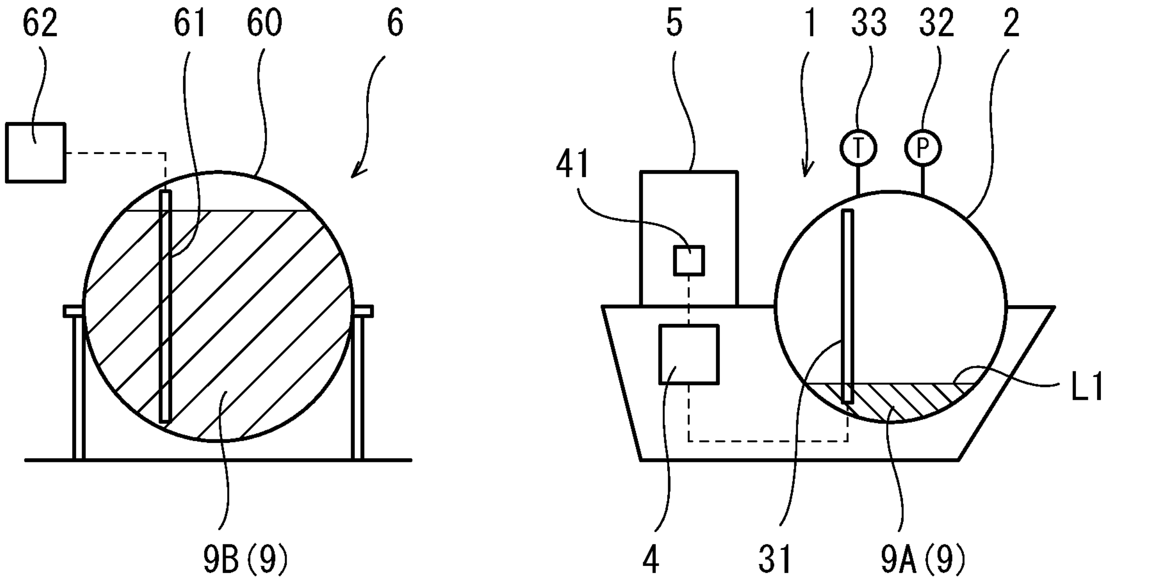
FIG. 1A shows a state before the first loading onto a ship on which a liquefied gas monitoring system according to one embodiment is installed.
Figure 1B:
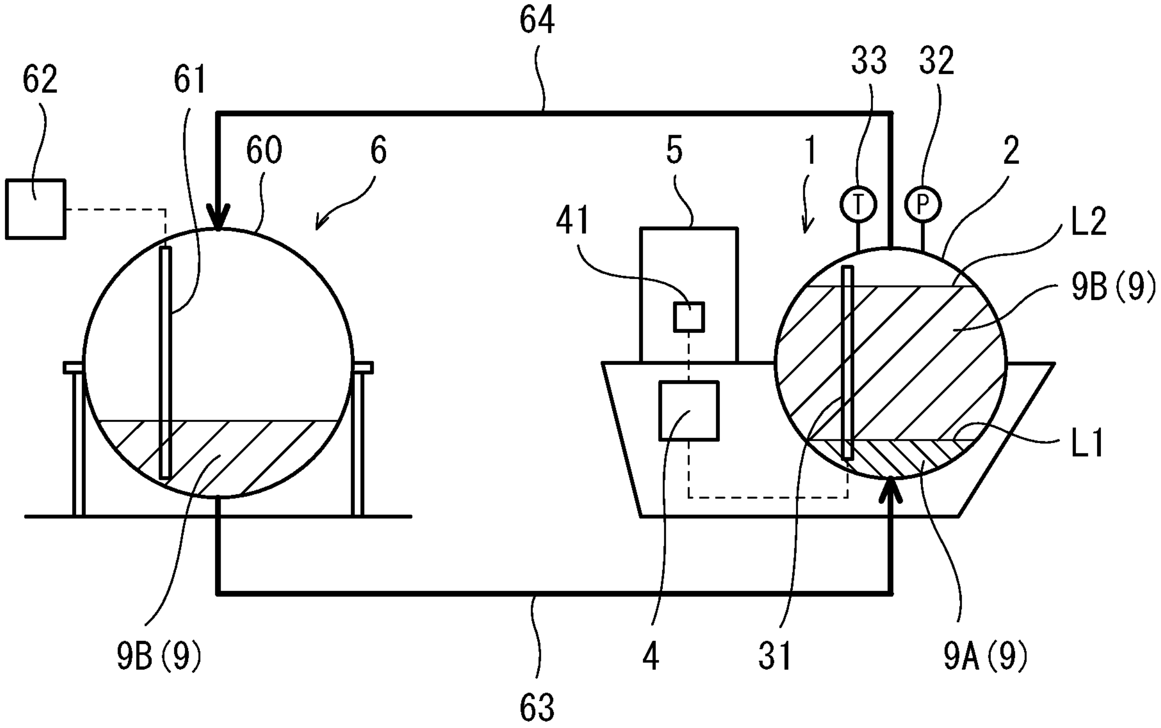
FIG. 1B shows a state after the first loading onto the ship.

FIG. 1A and FIG. 1B are drawings for describing loading for the first time, i.e., the first loading, onto the ship 5. FIG. 1A shows a state before the loading, and FIG. 1B shows a state after the loading.

The liquefied gas monitoring system 1 includes a container 2, which contains liquefied gas 9, which is obtained by liquefaction of single-component gas. Examples of the single-component gas include hydrogen, ammonia, and methane. The liquefied gas 9 may include almost no impurity, or may include impurities to some extent (e.g., 10% by mass or less).

In the present embodiment, before the first loading, the container 2 contains liquefied gas 9A with an environmental value Xa. That is, before the first loading, the liquefied gas 9A is fed into the container 2. A gaseous layer over the liquid level of the liquefied gas 9A in the container 2 is filled with a vaporization gas that results from vaporization of the liquefied gas 9A.

The liquefied gas monitoring system 1 further includes: a liquid level sensor 31, which detects a liquid level height in the container 2; and control circuitry 4 electrically connected to the liquid level sensor 31. The liquid level sensor 31 may be any type of sensor, such as a float type sensor, differential pressure type sensor, ultrasonic wave type sensor, or a laser type sensor.

In the present embodiment, the control circuitry 4 is electrically connected to both a pressure sensor 32 and a temperature sensor 33. However, the illustration of their connection lines is omitted in all the drawings for the purpose of simplifying the drawings. The pressure sensor 32 detects the pressure of the gaseous layer in the container 2. The temperature sensor 33 detects the temperature of the gaseous layer in the container 2. Alternatively, the temperature sensor 33 may detect the temperature of the liquefied gas 9 in the container 2.

The control circuitry 4 is electrically connected also to a display 41. Each time the liquefied gas 9 is fed into the container 2, the control circuitry 4 receives an input of the environmental value X of the liquefied gas 9. As mentioned above, the liquefied gas 9A is fed into the container 2 before the first loading. Accordingly, the environmental value Xa of the liquefied gas 9A is inputted to the control circuitry 4 before the first loading.

Regarding the control circuitry 4 (as with control circuitry 62, 72, and 82, which will be described below), the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In the present embodiment, the first loading onto the ship 5 is performed between the ship 5 and an on-land facility 6. The on-land facility 6 includes: a container 60, which contains the liquefied gas 9; a liquid level sensor 61, which detects a liquid level height in the container 60; and control circuitry 62 electrically connected to the liquid level sensor 61.

Alternatively, the loading onto the ship 5 may be performed between the ship 5 and a marine facility. Further alternatively, the loading onto the ship 5 may be performed between the ship 5 and another ship.

In the present embodiment, the container 60 contains liquefied gas 9B with an environmental value Xb. The environmental value Xb of the liquefied gas 9B may be the same as, or different from, the environmental value Xa of the liquefied gas 9A. A gaseous layer over the liquid level of the liquefied gas 9B in the container 60 is filled with a vaporization gas that results from vaporization of the liquefied gas 9B.

At the first loading onto the ship 5, after the ship 5 is moored to a quay wall near the on-land facility 6 as shown in FIG. 1A, the container 2 of the ship 5 and the container 60 of the on-land facility 6 are connected by a liquid pipe passage 63 and a gas pipe passage 64 as shown in FIG. 1B.

One end portion of the liquid pipe passage 63 is a fixed pipe mounted on the ship 5, and the other end portion of the liquid pipe passage 63 is a fixed pipe mounted on the on-land facility 6. A loading arm installed at the quay wall serves as the middle portion of the liquid pipe passage 63. In FIG. 1A, the illustration of the liquid pipe passage 63 is omitted for the purpose of simplifying the drawing.

Similarly, one end portion of the gas pipe passage 64 is a fixed pipe mounted on the ship 5, and the other end portion of the gas pipe passage 64 is a fixed pipe mounted on the on-land facility 6. A loading arm installed at the quay wall serves as the middle portion of the gas pipe passage 64. In FIG. 1A, the illustration of the gas pipe passage 64 is omitted for the purpose of simplifying the drawing.

In FIG. 1B, for the purpose of simplifying the drawing, the liquid pipe passage 63 is drawn under the containers 2 and 60, and the gas pipe passage 64 is drawn over the containers 2 and 60. However, an actual route and actual positions of openings of each of the liquid pipe passage 63 and the gas pipe passage 64 are set appropriately. For example, there may be a dome at the top of the container 2 of the ship 5, and the one end portion of each of the liquid pipe passage 63 and the gas pipe passage 64 may penetrate the dome.

After the connection by the liquid pipe passage 63 and the gas pipe passage 64 is completed, the liquefied gas 9B is fed from the container 60 of the on-land facility 6 to the container 2 of the ship 5 through the liquid pipe passage 63, and the vaporization gas is fed from the gaseous layer in the container 2 to the gaseous layer in the container 60 through the gas pipe passage 64.

Before the liquefied gas 9B is fed into the container 2, the control circuitry 4 determines an amount Ya of the liquefied gas 9A previously fed into and still remaining in the container 2 based on a liquid level height L1 detected by the liquid level sensor 31, a pressure P detected by the pressure sensor 32, and a temperature T detected by the temperature sensor 33, and stores the determined amount Ya of the liquefied gas 9A together with the environmental value Xa. The amount Ya is in units of, for example, kg (the same applies to an amount Yb and so forth described below). At the first loading, only the previously fed liquefied gas 9A remains in the container 2. Accordingly, the control circuitry 4 calculates the amount Ya of the liquefied gas 9A by multiplying the internal volume of the container 2 under the liquid level height L1 detected by the liquid level sensor 31 by the density of the liquefied gas 9 at the pressure P and the temperature T.

Since the liquefied gas 9A is the liquefied gas 9 merely distinguished by its environmental value X, the density of the liquefied gas 9A is the same as the density of the liquefied gas 9. The same applies to the liquefied gas 9B as well as to liquefied gas 9C and liquefied gas 9D, which will be described below.

For example, in a case where the liquefied gas 9 is liquefied hydrogen, the density of the liquefied gas 9 at the saturated temperature (−253° C.) when the pressure is the atmospheric pressure (about 0.1 MPa) is 71 kg/m3. When the pressure changes to 1.0 MPa (saturated temperature: −242° C.), the density decreases to 50 kg/m3. The control circuitry 4 prestores a physical property table, or a relational expression, that indicates a relationship among the pressure, the temperature, and the density of the liquefied gas 9. The control circuitry 4 determines the density of the liquefied gas 9 by using the physical property table or the relational expression.

Before, during, or after the loading, the environmental value Xb of the liquefied gas 9B fed into the container 2 is inputted to the control circuitry 4. The inputting of the environmental value Xb to the control circuitry 4 may be performed by wireless communication from the control circuitry 62 to the control circuitry 4 in a case where the environmental value Xb of the liquefied gas 9B is prestored in the control circuitry 62, or may be manually performed by a worker via an inputter electrically connected to the control circuitry 4.

After the liquefied gas 9B is fed into the container 2, the control circuitry 4 determines an amount Yb of the liquefied gas 9B fed at this time based on a liquid level height L2 measured by the liquid level sensor 31, the pressure P detected by the pressure sensor 32, and the temperature T detected by the temperature sensor 33, and stores the determined amount Yb of the liquefied gas 9B together with the environmental value Xb. Specifically, the control circuitry 4 calculates the amount Yb of the liquefied gas 9B by multiplying the internal volume of the container 2 between the liquid level height L1 before the loading and the liquid level height L2 after the loading by the density of the liquefied gas 9 at the pressure P and the temperature T.

Before the liquefied gas 9B is fed into the container 2, the previously fed liquefied gas 9A is the only liquefied gas 9 remaining in the container 2. Therefore, if the amount Ya and the environmental value Xa of the previously fed liquefied gas 9A, and the amount Yb and the environmental value Xb of the liquefied gas 9B fed at this time, are stored, then by referring to these data, the amounts Ya and Yb and the environmental values Xa and Xb of the liquefied gas 9A and 9B, which are mixed together, can be precisely recognized.

After the liquefied gas 9B is fed into the container 2, the control circuitry 4 causes the display 41 to concurrently display the amount Ya and the environmental value Xa of the previously fed liquefied gas 9A and the amount Yb and the environmental value Xb of the liquefied gas 9B fed at this time. This makes it possible to visually recognize the amounts Ya and Yb and the environmental values Xa and Xb of the liquefied gas 9A and 9B, which are mixed together.

Figure 2A:
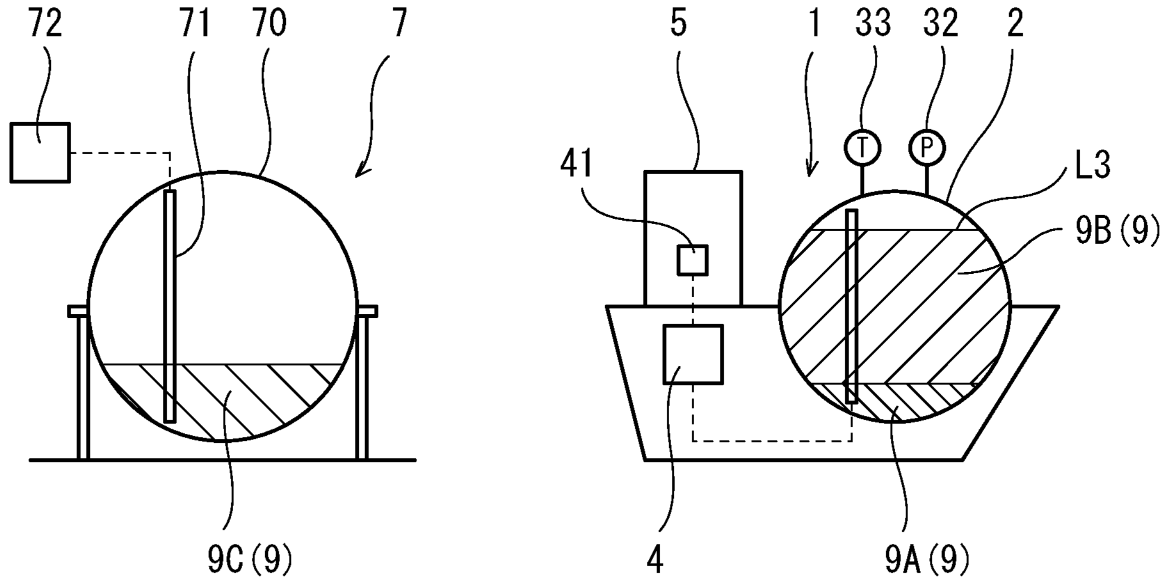
FIG. 2A shows a state before unloading from the ship.
Figure 2B:
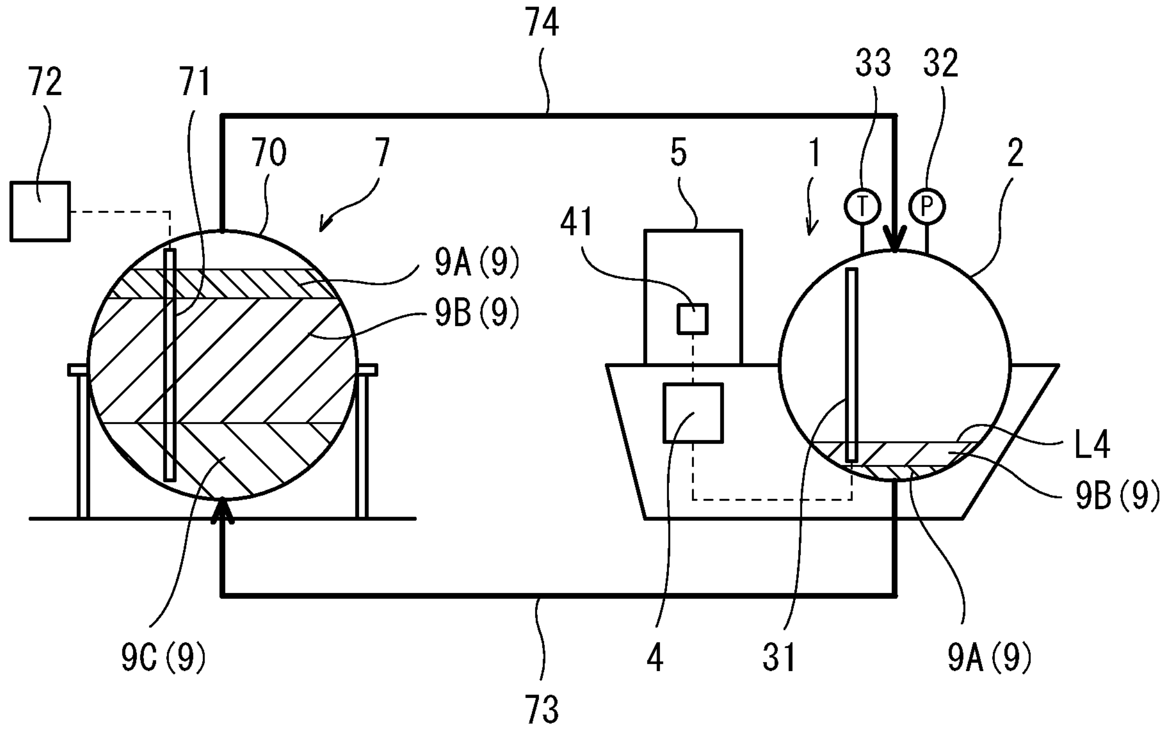
FIG. 2B shows a state after the unloading from the ship.

FIG. 2A and FIG. 2B are drawings for describing unloading from the ship 5. FIG. 2A shows a state before the unloading, and FIG. 2B shows a state after the unloading.

In the present embodiment, unloading from the ship 5 is performed between the ship 5 and an on-land facility 7. The on-land facility 7 includes: a container 70, which contains the liquefied gas 9; a liquid level sensor 71, which detects a liquid level height in the container 70; and control circuitry 72 electrically connected to the liquid level sensor 71.

Alternatively, the unloading from the ship 5 may be performed between the ship 5 and a marine facility. Further alternatively, the unloading from the ship 5 may be performed between the ship 5 and another ship.

In the present embodiment, the container 70 contains liquefied gas 9C with an environmental value Xc. The environmental value Xc of the liquefied gas 9C may be the same as the environmental value Xa of the liquefied gas 9A or the environmental value Xb of the liquefied gas 9B, or may be different from both the environmental value Xa of the liquefied gas 9A and the environmental value Xb of the liquefied gas 9B. A gaseous layer over the liquid level of the liquefied gas 9C in the container 70 is filled with a vaporization gas that results from vaporization of the liquefied gas 9C.

In the unloading from the ship 5, after the ship 5 is moored to a quay wall near the on-land facility 7 as shown in FIG. 2A, the container 2 of the ship 5 and the container 70 of the on-land facility 7 are connected by a liquid pipe passage 73 and a gas pipe passage 74 as shown in FIG. 2B.

One end portion of the liquid pipe passage 73 is a fixed pipe mounted on the ship 5, and the other end portion of the liquid pipe passage 73 is a fixed pipe mounted on the on-land facility 7. A loading arm installed at the quay wall serves as the middle portion of the liquid pipe passage 73. In FIG. 2A, the illustration of the liquid pipe passage 73 is omitted for the purpose of simplifying the drawing.

Similarly, one end portion of the gas pipe passage 74 is a fixed pipe mounted on the ship 5, and the other end portion of the gas pipe passage 74 is a fixed pipe mounted on the on-land facility 7. A loading arm installed at the quay wall serves as the middle portion of the gas pipe passage 74. In FIG. 2A, the illustration of the gas pipe passage 74 is omitted for the purpose of simplifying the drawing.

In FIG. 2B, for the purpose of simplifying the drawing, the liquid pipe passage 73 is drawn under the containers 2 and 70, and the gas pipe passage 74 is drawn over the containers 2 and 70. However, similar to the case of the liquid pipe passage 63 and the gas pipe passage 64 of the on-land facility 6, an actual route and actual positions of openings of each of the liquid pipe passage 73 and the gas pipe passage 74 are set appropriately.

After the connection by the liquid pipe passage 73 and the gas pipe passage 74 is completed, the liquefied gas 9, which is the mixture of the liquefied gas 9A and the liquefied gas 9B, is reclaimed from the container 2 of the ship 5 to the container 70 of the on-land facility 7 through the liquid pipe passage 73, and the vaporization gas is fed from the gaseous layer in the container 70 to the gaseous layer in the container 2 through the gas pipe passage 74.

Before the liquefied gas 9 is reclaimed from the container 2, the control circuitry 4 determines amounts Ya1 and Yb1 of the liquefied gas 9A and 9B, respectively, which have been fed into the container 2 at the most recent at least two times of liquefied gas feeding into the container 2 and which are present in the container 2, based on a liquid level height L3 detected by the liquid level sensor 31, the pressure P detected by the pressure sensor 32, and the temperature T detected by the temperature sensor 33, and stores the determined amounts Ya1 and Yb1 of the liquefied gas 9A and 9B together with the environmental values Xa and Xb. Specifically, the control circuitry 4 calculates a total amount Y of the liquefied gas 9 by multiplying the internal volume of the container 2 under the liquid level height L3 detected by the liquid level sensor 31 by the density of the liquefied gas 9 at the pressure P and the temperature T, and then calculates the amounts Ya1 and Yb1 of the liquefied gas 9A and 9B by multiplying the total amount Y by a ratio (Ya/(Ya+Yb)) and a ratio (Yb/(Ya+Yb)) of the amount Ya and the amount Yb stored after the most recent liquefied gas feeding into the container 2.

Before the liquefied gas 9 is reclaimed from the container 2, the liquefied gas 9A and 9B, which have been fed into the container 2 at the most recent two times of liquefied gas feeding into the container 2, account for a large portion of the liquefied gas 9 present in the container 2 (in the case of the first unloading, account for the entire liquefied gas 9 present in the container 2). Therefore, if the amounts Ya1 and Yb1 and the environmental values Xa and Xb of the liquefied gas 9A and 9B, which have been fed into the container 2 at the most recent at least two times of liquefied gas feeding into the container 2, are stored before the reclaiming of the liquefied gas 9, then by comparing these data with data that is stored after the most recent liquefied gas feeding into the container 2, the amount and the environmental value of the liquefied gas 9 that has been consumed as boil off gas before the reclaiming of the liquefied gas 9 can be recognized.

After the liquefied gas 9 is reclaimed from the container 2, the control circuitry 4 determines amounts Ya2 and Yb2 of the liquefied gas 9A and 9B, respectively, which have been fed into the container 2 at the most recent at least two times of liquefied gas feeding into the container 2 and which still remain in the container 2, based on a liquid level height L4 detected by the liquid level sensor 31, the pressure P detected by the pressure sensor 32, and the temperature T detected by the temperature sensor 33, and stores the determined amounts Ya2 and Yb2 of the liquefied gas 9A and 9B together with the environmental values Xa and Xb. Specifically, the control circuitry 4 calculates the total amount Y of the liquefied gas 9 by multiplying the internal volume of the container 2 under the liquid level height L4 detected by the liquid level sensor 31 by the density of the liquefied gas 9 at the pressure P and the temperature T, and then calculates the amounts Ya2 and Yb2 of the liquefied gas 9A and 9B by multiplying the total amount Y by the ratio (Ya/(Ya+Yb)) and the ratio (Yb/(Ya+Yb)) of the amount Ya and the amount Yb stored after the most recent liquefied gas feeding into the container 2.

Thus, also after the reclaiming of the liquefied gas 9, the amounts Ya2 and Yb2 and the environmental values Xa and Xb of the liquefied gas 9A and 9B, which have been fed into the container 2 at the most recent at least two times of liquefied gas feeding into the container 2, are stored. Therefore, by referring to these data, the amounts Ya2 and Yb2 and the environmental values Xa and Xb of the liquefied gas 9A and 9B, which have been fed into the container 2 at the most recent at least two times of liquefied gas feeding into the container 2 and which still remain in the container 2, can be recognized.

Further, after the liquefied gas 9B is reclaimed from the container 2, the control circuitry 4 causes the display 41 to concurrently display the amounts Ya2 and Yb2 and the environmental values Xa and Xb of the liquefied gas 9A and 9B, which have been fed into the container 2 at the most recent at least two times of liquefied gas feeding into the container 2 and which still remain in the container 2. This makes it possible to visually recognize the amounts Ya2 and Yb2 and the environmental values Xa and Xb of the liquefied gas 9A and 9B, which have been fed into the container 2 at the most recent at least two times of liquefied gas feeding into the container 2 and which still remain in the container 2.

In a case where the liquefied gas 9 is reclaimed from the container 2, the control circuitry 4 receives an input of an environmental value Xg of the vaporization gas fed to the gaseous layer in the container 2. The inputting of the environmental value Xg to the control circuitry 4 may be performed by wireless communication from the control circuitry 72 to the control circuitry 4 in a case where the environmental value Xg of the vaporization gas is prestored in the control circuitry 72, or may be manually performed by a worker via an inputter electrically connected to the control circuitry 4.

As described above, the gaseous layer in the container 70 of the on-land facility 7 is filled with the vaporization gas that results from the vaporization of the liquefied gas 9C. Accordingly, the environmental value Xg of the vaporization gas fed to the gaseous layer in the container 2 is the same as the environmental value Xc of the liquefied gas 9C. In a case where one liquefied gas 9 and the other liquefied gas 9 with different environmental values X from each other are mixed together in the container 70, the environmental value Xg of the vaporization gas fed from the container 70 into the container 2 may be calculated based on, for example, the mixing ratio of the one liquefied gas and the other liquefied gas.

After the liquefied gas 9 is reclaimed from the container 2, the control circuitry 4 stores an amount Yg of the vaporization gas that has been fed to the gaseous layer in the container 2 together with the environmental value Xg. This makes it possible to manage not only the amount and the environmental value of the liquefied gas 9, but also the amount and the environmental value of the vaporization gas.

The amount Yg of the vaporization gas that has been fed to the gaseous layer in the container 2 can be calculated, for example, by integrating the flow rate of the vaporization gas flowing through the gas pipe passage 74. Alternatively, the amount Yg of the vaporization gas may be calculated by multiplying the internal volume of the container 2 between the liquid level height L3 before the unloading and the liquid level height L4 after the unloading by the density of the vaporization gas at the pressure P detected by the pressure sensor 32 and the temperature T detected by the temperature sensor 33.

Figure 3A:
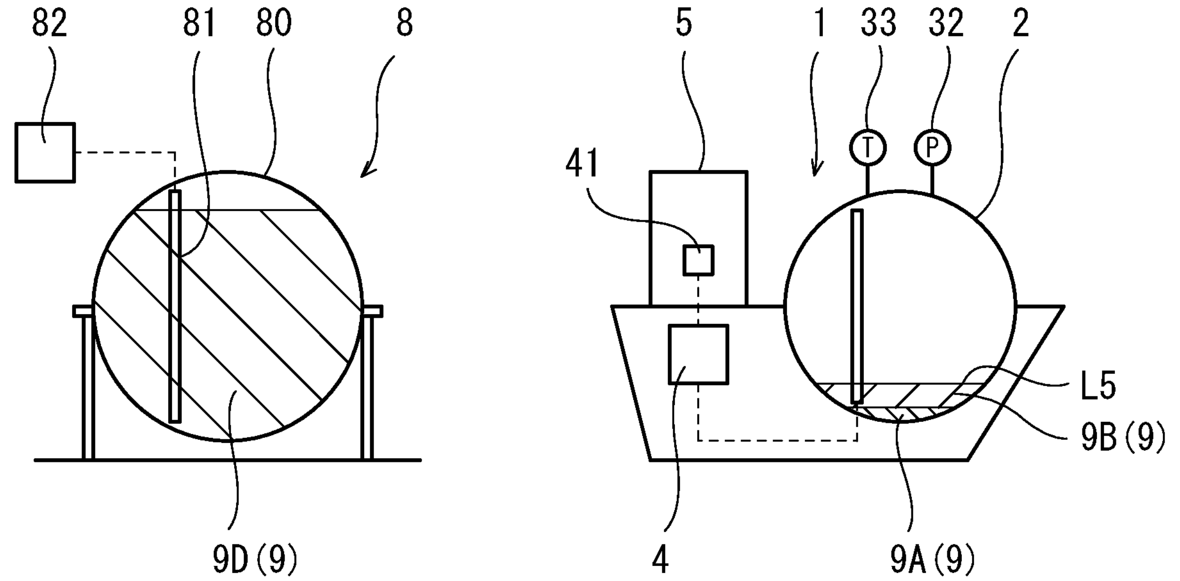
FIG. 3A shows a state before the second loading onto the ship.
Figure 3B:
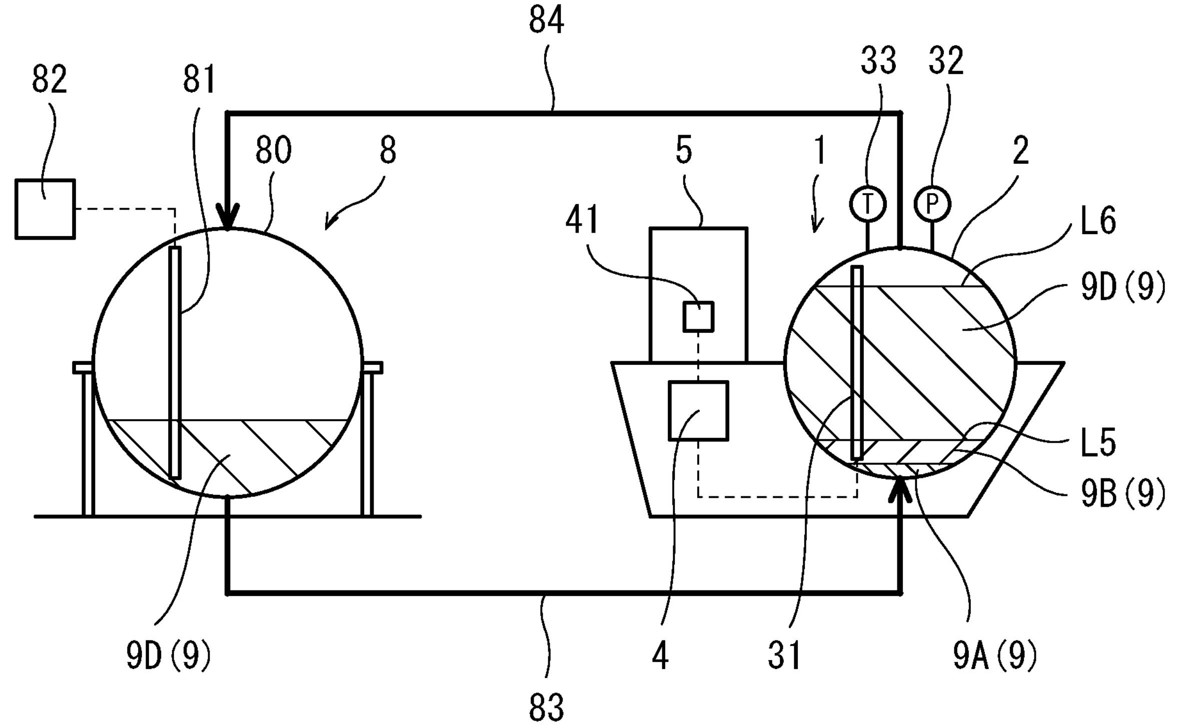
FIG. 3B shows a state after the second loading onto the ship.

FIG. 3A and FIG. 3B are drawings for describing loading for the second time, i.e., the second loading, onto the ship 5. FIG. 3A shows a state before the loading, and FIG. 3B shows a state after the loading.

In the present embodiment, the second loading onto the ship 5 is performed between the ship 5 and an on-land facility 8. The on-land facility 8 includes: a container 80, which contains the liquefied gas 9; a liquid level sensor 81, which detects a liquid level height in the container 80; and control circuitry 82 electrically connected to the liquid level sensor 81. The on-land facility 8 may be the same as or different from the on-land facility 6, onto which the first loading has been performed.

Alternatively, the loading onto the ship 5 may be performed between the ship 5 and a marine facility. Further alternatively, the loading onto the ship 5 may be performed between the ship 5 and another ship.

In the present embodiment, the container 80 contains liquefied gas 9D with an environmental value Xd. The environmental value Xd of the liquefied gas 9D may be the same as the environmental value Xa of the liquefied gas 9A, the environmental value Xb of the liquefied gas 9B, or the environmental value Xc of the liquefied gas 9C, or may be different from all of the environmental value Xa of the liquefied gas 9A, the environmental value Xb of the liquefied gas 9B, and the environmental value Xc of the liquefied gas 9C. A gaseous layer over the liquid level of the liquefied gas 9D in the container 80 is filled with a vaporization gas that results from vaporization of the liquefied gas 9D.

At the second loading onto the ship 5, after the ship 5 is moored at a quay wall near the on-land facility 8 as shown in FIG. 3A, the container 2 of the ship 5 and the container 80 of the on-land facility 8 are connected by a liquid pipe passage 83 and a gas pipe passage 84 as shown in FIG. 3B.

One end portion of the liquid pipe passage 83 is a fixed pipe mounted on the ship 5, and the other end portion of the liquid pipe passage 83 is a fixed pipe mounted on the on-land facility 8. A loading arm installed at the quay wall serves as the middle portion of the liquid pipe passage 83. In FIG. 3A, the illustration of the liquid pipe passage 83 is omitted for the purpose of simplifying the drawing.

Similarly, one end portion of the gas pipe passage 84 is a fixed pipe mounted on the ship 5, and the other end portion of the gas pipe passage 84 is a fixed pipe mounted on the on-land facility 8. A loading arm installed at the quay wall serves as the middle portion of the gas pipe passage 84. In FIG. 3A, the illustration of the gas pipe passage 84 is omitted for the purpose of simplifying the drawing.

In FIG. 3B, for the purpose of simplifying the drawing, the liquid pipe passage 83 is drawn under the containers 2 and 80, and the gas pipe passage 84 is drawn over the containers 2 and 80. However, similar to the case of the liquid pipe passage 63 and the gas pipe passage 64 of the on-land facility 6, an actual route and actual positions of openings of each of the liquid pipe passage 83 and the gas pipe passage 84 are set appropriately.

After the connection by the liquid pipe passage 83 and the gas pipe passage 84 is completed, the liquefied gas 9D is fed from the container 80 of the on-land facility 8 to the container 2 of the ship 5 through the liquid pipe passage 83, and the vaporization gas is fed from the gaseous layer in the container 2 to the gaseous layer in the container 80 through the gas pipe passage 84.

Before the liquefied gas 9D is fed into the container 2, the control circuitry 4 determines an amount Yb3 of the liquefied gas 9B previously fed into and still remaining in the container 2 based on a liquid level height L5 detected by the liquid level sensor 31, the pressure P detected by the pressure sensor 32, and the temperature T detected by the temperature sensor 33, and stores the determined amount Yb3 of the liquefied gas 9B together with the environmental value Xb. Specifically, the control circuitry 4 calculates the total amount Y of the liquefied gas 9 by multiplying the internal volume of the container 2 under the liquid level height L5 detected by the liquid level sensor 31 by the density of the liquefied gas 9 at the pressure P and the temperature T, and then calculates the amount Yb3 of the liquefied gas 9B by multiplying the total amount Y by the ratio (Yb/(Ya+Yb)) of the amount Yb stored after the previous liquefied gas feeding.

Before, during, or after the loading, the environmental value Xd of the liquefied gas 9D fed into the container 2 is inputted to the control circuitry 4. The inputting of the environmental value Xd to the control circuitry 4 may be performed by wireless communication from the control circuitry 82 to the control circuitry 4 in a case where the environmental value Xd of the liquefied gas 9D is prestored in the control circuitry 82, or may be manually performed by a worker via an inputter electrically connected to the control circuitry 4.

After the liquefied gas 9D is fed into the container 2, the control circuitry 4 determines an amount Yd of the liquefied gas 9D fed at this time based on a liquid level height L6 measured by the liquid level sensor 31, the pressure P detected by the pressure sensor 32, and the temperature T detected by the temperature sensor 33, and stores the determined amount Yd of the liquefied gas 9D together with the environmental value Xd. Specifically, the control circuitry 4 calculates the amount Yd of the liquefied gas 9D by multiplying the internal volume of the container 2 between the liquid level height L5 before the loading and the liquid level height L6 after the loading by the density of the liquefied gas 9 at the pressure P and the temperature T.

Before the liquefied gas 9D is fed into the container 2, a large portion of the liquefied gas 9 remaining in the container 2 is the liquefied gas 9B previously fed into the container 2. Therefore, if the amount Yb3 and the environmental value Xb of the previously fed liquefied gas 9B, and the amount Yd and the environmental value Xd of the liquefied gas 9D fed at this time, are stored, then by referring to these data, the amounts Yb3 and Yd and the environmental values Xb and Xd of the liquefied gas 9B and 9D, which are mixed together, can be precisely recognized. In addition, by referring to the past data, a mixing history of the liquefied gas 9 can be tracked.

Variations

The present disclosure is not limited to the above-described embodiment. Various modifications can be made without departing from the scope of the present disclosure.

For example, in a case where the pressure and temperature of the gaseous layer of the liquefied gas 9 in the container 2 is maintained substantially constant, at the loading onto the ship 5, the control circuitry 4 may, based solely on the liquid level height (L1, L2, L5, or L6) detected by the liquid level sensor 31, determine, before the liquefied gas 9 is fed into the container 2, the amount of the liquefied gas (9A or 9B) previously fed into and still remaining in the container 2, and determine, after the liquefied gas 9 is fed into the container 2, the amount of the liquefied gas (9B or 9D) fed at this time. In this case, at the unloading from the ship 5, the control circuitry 4 may, based solely on the liquid level height (L3 or L4) detected by the liquid level sensor 31, determine, before the liquefied gas 9 is reclaimed from the container 2, the amounts of the liquefied gas 9A and 9B, which have been fed into the container 2 at the most recent at least two times of liquefied gas feeding into the container 2 and which are present in the container 2, and determine, after the liquefied gas 9 is reclaimed from the container 2, the amounts of the liquefied gas 9A and 9B, which have been fed into the container 2 at the most recent at least two times of liquefied gas feeding into the container 2 and which still remain in the container 2.

However, if the amount of the liquefied gas is determined not only based on the liquid level height detected by the liquid level sensor 31, but also based on the pressure P detected by the pressure sensor 32 and the temperature T detected by the temperature sensor 33 as in the above-described embodiment, the amount of the liquefied gas can be determined precisely.

Summary

The present disclosure provides a liquefied gas monitoring system including: a container that contains liquefied gas that is obtained by liquefaction of single-component gas; a liquid level sensor that detects a liquid level height in the container; and control circuitry that receives, each time the liquefied gas is fed into the container, an input of an environmental value of the fed liquefied gas. The control circuitry: before the liquefied gas is fed into the container, determines an amount of the liquefied gas previously fed into and still remaining in the container based on the liquid level height detected by the liquid level sensor, and stores the determined amount of the previously fed liquefied gas together with the environmental value; and after the liquefied gas is fed into the container, determines an amount of the liquefied gas fed at this time based on the liquid level height detected by the liquid level sensor, and stores the determined amount of the liquefied gas fed at this time together with the environmental value.

Before the liquefied gas is fed into the container, a large portion of the liquefied gas remaining in the container is the liquefied gas previously fed into the container. Therefore, if the amount and the environmental value of the previously fed liquefied gas, and the amount and the environmental value of the liquefied gas fed at this time, are stored, then by referring to these data, the amounts and the environmental values of the previously fed liquefied gas and the liquefied gas fed at this time, which are mixed together, can be precisely recognized. In addition, by referring to the past data, a mixing history of the liquefied gas can be tracked.

The above liquefied gas monitoring system may include: a pressure sensor that detects a pressure of a gaseous layer in the container; and a temperature sensor that detects a temperature of the gaseous layer or a temperature of the liquefied gas in the container. The control circuitry may, not only based on the liquid level height detected by the liquid level sensor, but also based on the pressure detected by the pressure sensor and the temperature detected by the temperature sensor, determine, before the liquefied gas is fed into the container, the amount of the liquefied gas previously fed into and still remaining in the container, and determine, after the liquefied gas is fed into the container, the amount of the liquefied gas fed at this time. This configuration makes it possible to precisely determine the amount of the liquefied gas.

After the liquefied gas is fed into the container, the control circuitry may cause a display to concurrently display the amount and the environmental value of the previously fed liquefied gas and the amount and the environmental value of the liquefied gas fed at this time. This configuration makes it possible to visually recognize the amounts and the environmental values of one liquefied gas and the other liquefied gas that are mixed together.

The control circuitry may: before the liquefied gas is reclaimed from the container, determine, based on the liquid level height detected by the liquid level sensor, amounts of the liquefied gas that have been fed into the container at most recent at least two times of liquefied gas feeding into the container and that are present in the container, and store each of the determined amounts of the liquefied gas together with the environmental value; and after the liquefied gas is reclaimed from the container, determine, based on the liquid level height detected by the liquid level sensor, amounts of the liquefied gas that have been fed into the container at the most recent at least two times of liquefied gas feeding into the container and that still remain in the container, and store each of the determined amounts of the liquefied gas together with the environmental value. Before the liquefied gas is reclaimed from the container, the liquefied gas fed into the container at the most recent two times of liquefied gas feeding into the container accounts for a large portion of the liquefied gas present in the container. Therefore, if the amounts and the environmental values of the liquefied gas fed into the container at the most recent at least two times of liquefied gas feeding into the container are stored before the reclaiming of the liquefied gas, then by comparing these data with data that is stored after the most recent liquefied gas feeding into the container, the amount and the environmental value of the liquefied gas that has been consumed as boil off gas before the reclaiming of the liquefied gas can be recognized. In addition, also after the reclaiming of the liquefied gas, the amounts and the environmental values of the liquefied gas fed into the container at the most recent at least two times of liquefied gas feeding into the container are stored. Therefore, by referring to these data, the amounts and the environmental values of the liquefied gas fed into the container at the most recent at least two times of liquefied gas feeding into the container and still remaining in the container can be recognized.

The liquefied gas monitoring system may include: a pressure sensor that detects a pressure of a gaseous layer in the container; and a temperature sensor that detects a temperature of the gaseous layer or a temperature of the liquefied gas in the container. The control circuitry may, not only based on the liquid level height detected by the liquid level sensor, but also based on the pressure detected by the pressure sensor and the temperature detected by the temperature sensor, determine, before the liquefied gas is reclaimed from the container, the amounts of the liquefied gas that have been fed into the container at the most recent at least two times of liquefied gas feeding into the container and that are present in the container, and determine, after the liquefied gas is reclaimed from the container, the amounts of the liquefied gas that have been fed into the container at the most recent at least two times of liquefied gas feeding into the container and that still remain in the container. This configuration makes it possible to precisely determine the amounts of the liquefied gas.

After the liquefied gas is reclaimed from the container, the control circuitry may cause a display to concurrently display the amounts and the environmental values of the liquefied gas fed into the container at the most recent at least two times of liquefied gas feeding into the container and still remaining in the container. This configuration makes it possible to visually recognize the amounts and the environmental values of the liquefied gas fed into the container at the most recent at least two times of liquefied gas feeding into the container and still remaining in the container.

In a case where the liquefied gas is reclaimed from the container, a vaporization gas may be fed to a gaseous layer in the container, and the control circuitry may receive an input of an environmental value of the vaporization gas, and after the liquefied gas is reclaimed from the container, the control circuitry may store an amount of the vaporization gas that has been fed to the gaseous layer in the container together with the environmental value. This configuration makes it possible to manage not only the amount and the environmental value of the liquefied gas, but also the amount and the environmental value of the vaporization gas.

The invention claimed is:

1. A liquefied gas monitoring system comprising:

a container that contains liquefied gas that is obtained by liquefaction of single-component gas;

a liquid level sensor that detects a liquid level height in the container; and control circuitry that receives, each time the liquefied gas is fed into the container, an input of an environmental value of the fed liquefied gas, wherein the control circuitry:

before the liquefied gas is fed into the container, determines an amount of the liquefied gas previously fed into and still remaining in the container based on the liquid level height detected by the liquid level sensor, and stores the determined amount of the previously fed liquefied gas together with the environmental value; and after the liquefied gas is fed into the container, determines an amount of the liquefied gas fed at this time based on the liquid level height detected by the liquid level sensor, and stores the determined amount of the liquefied gas fed at this time together with the environmental value.

2. The liquefied gas monitoring system according to claim 1, comprising:

a pressure sensor that detects a pressure of a gaseous layer in the container; and a temperature sensor that detects a temperature of the gaseous layer or a temperature of the liquefied gas in the container, wherein the control circuitry, not only based on the liquid level height detected by the liquid level sensor, but also based on the pressure detected by the pressure sensor and the temperature detected by the temperature sensor, determines, before the liquefied gas is fed into the container, the amount of the liquefied gas previously fed into and still remaining in the container, and determines, after the liquefied gas is fed into the container, the amount of the liquefied gas fed at this time.

3. The liquefied gas monitoring system according to claim 1, wherein after the liquefied gas is fed into the container, the control circuitry causes a display to concurrently display the amount and the environmental value of the previously fed liquefied gas and the amount and the environmental value of the liquefied gas fed at this time.

4. The liquefied gas monitoring system according to claim 1, wherein the control circuitry:

before the liquefied gas is reclaimed from the container, determines, based on the liquid level height detected by the liquid level sensor, amounts of the liquefied gas that have been fed into the container at most recent at least two times of liquefied gas feeding into the container and that are present in the container, and stores each of the determined amounts of the liquefied gas together with the environmental value; and after the liquefied gas is reclaimed from the container, determines, based on the liquid level height detected by the liquid level sensor, amounts of the liquefied gas that have been fed into the container at the most recent at least two times of liquefied gas feeding into the container and that still remain in the container, and stores each of the determined amounts of the liquefied gas together with the environmental value.

5. The liquefied gas monitoring system according to claim 4, comprising:

a pressure sensor that detects a pressure of a gaseous layer in the container; and a temperature sensor that detects a temperature of the gaseous layer or a temperature of the liquefied gas in the container, wherein the control circuitry, not only based on the liquid level height detected by the liquid level sensor, but also based on the pressure detected by the pressure sensor and the temperature detected by the temperature sensor, determines, before the liquefied gas is reclaimed from the container, the amounts of the liquefied gas that have been fed into the container at the most recent at least two times of liquefied gas feeding into the container and that are present in the container, and determines, after the liquefied gas is reclaimed from the container, the amounts of the liquefied gas that have been fed into the container at the most recent at least two times of liquefied gas feeding into the container and that still remain in the container.

6. The liquefied gas monitoring system according to claim 4, wherein after the liquefied gas is reclaimed from the container, the control circuitry causes a display to concurrently display the amounts and the environmental values of the liquefied gas fed into the container at the most recent at least two times of liquefied gas feeding into the container and still remaining in the container.

7. The liquefied gas monitoring system according to claim 1, wherein in a case where the liquefied gas is reclaimed from the container, a vaporization gas is fed to a gaseous layer in the container, and the control circuitry receives an input of an environmental value of the vaporization gas, and after the liquefied gas is reclaimed from the container, the control circuitry stores an amount of the vaporization gas that has been fed to the gaseous layer in the container together with the environmental value.

* * * * *